(12) United States Patent
Altman et al.

(10) Patent No.: US 7,815,398 B2
(45) Date of Patent: *Oct. 19, 2010

(54) METHODS OF POSITIONING AN ELEVATING SUPPORT VESSEL

(75) Inventors: Richard A. Altman, Kingwood, TX (US); Michael D. Brown, Humble, TX (US); Peter W. Nimmo, Magnolia, TX (US)

(73) Assignee: Remedial Cayman Limited, Grand Cayman (KY)

( * ) Notice: Subject to any disclaimer, the term of this patent is extended or adjusted under 35 U.S.C. 154(b) by 287 days.

This patent is subject to a terminal disclaimer.

(21) Appl. No.: 12/079,324

(22) Filed: Mar. 26, 2008

(65) Prior Publication Data

US 2008/0237171 A1 Oct. 2, 2008

Related U.S. Application Data

(60) Provisional application No. 60/920,974, filed on Mar. 30, 2007, provisional application No. 61/030,815, filed on Feb. 22, 2008.

(51) Int. Cl.
*E02B 17/08* (2006.01)
(52) U.S. Cl. ........................ 405/196; 405/197; 405/198; 405/199
(58) Field of Classification Search ............... 405/195.1, 405/196, 197, 198, 199, 200, 224
See application file for complete search history.

(56) References Cited

U.S. PATENT DOCUMENTS

| 3,001,592 A | 9/1961 | Lucas |
| 3,001,594 A | 9/1961 | Suderow |
| 3,001,595 A | 9/1961 | Lucas |
| 3,189,093 A | 6/1965 | De Vries |
| 3,294,051 A | 12/1966 | Khelstovsky |
| 3,433,024 A | 3/1969 | Diamand et al. |
| 3,628,336 A | 12/1971 | Moore et al. |

(Continued)

FOREIGN PATENT DOCUMENTS

DE 2722747 A 12/1977

(Continued)

OTHER PUBLICATIONS

Ades Advanced Energy Systems; http://www.adesegypt.com/divisions2.htm; pp. 1-2; website print Feb. 7, 2008.

(Continued)

*Primary Examiner*—Frederick L Lagman

(57) ABSTRACT

A vessel is provided that is an improvement over previously disclosed jack-up rigs and lift boats. The vessel has at least three thrusters and is self-propelled. The vessel additionally has a raised and hollow crane support on which a crane may be mounted. The crane support is preferably affixed to tracks, which permit the crane to slide along the deck of the vessel. The raised and hollowed feature of the crane support permits the storage of equipment and things beneath the crane support without hindering the movement of the crane along the tracks. Optionally, the vessel further has an extension assembly atop which may be deployed a workover rig assembly. The crane may be used to assemble the extension assembly and thus aid in the construction, remediation, and demolition of offshore oil and gas platforms and wells.

6 Claims, 8 Drawing Sheets

U.S. PATENT DOCUMENTS

| | | | |
|---|---|---|---|
| 3,727,414 A | 4/1973 | Davies | |
| 3,797,256 A | 3/1974 | Giblon | |
| 3,830,071 A | 8/1974 | LeTourneau | |
| 3,860,122 A | 1/1975 | Cernosek | |
| 4,081,932 A | 4/1978 | Armstrong | |
| 4,269,542 A | 5/1981 | Mueller | |
| 4,401,398 A | 8/1983 | Remson | |
| 4,455,109 A | 6/1984 | Lorenz | |
| 4,483,644 A | 11/1984 | Johnson | |
| 4,563,109 A | 1/1986 | Ortemond | |
| 4,602,894 A | 7/1986 | Lorenz et al. | |
| 4,652,177 A | 3/1987 | Gunther, Jr. et al. | |
| 4,735,526 A * | 4/1988 | Kawagoe et al. | 405/196 |
| 4,916,999 A | 4/1990 | Palmer et al. | |
| 4,973,198 A | 11/1990 | Cox | |
| 5,388,930 A | 2/1995 | McNease | |
| 5,419,657 A | 5/1995 | Davis | |
| 5,492,436 A | 2/1996 | Suksumake | |
| 5,580,189 A | 12/1996 | Sanders et al. | |
| 5,611,645 A * | 3/1997 | Breeden | 405/196 |
| 5,667,013 A | 9/1997 | Bain | |
| 5,855,455 A | 1/1999 | Williford et al. | |
| 5,997,217 A | 12/1999 | Verret | |
| 6,200,069 B1 | 3/2001 | Miller | |
| 6,257,165 B1 | 7/2001 | Danos, Jr. et al. | |
| 6,378,450 B1 | 4/2002 | Begnaud et al. | |
| 6,390,732 B1 | 5/2002 | Kristensen et al. | |
| 6,607,331 B2 | 8/2003 | Sanders et al. | |
| 6,718,903 B1 | 4/2004 | Moise, II et al. | |
| 6,729,804 B1 | 5/2004 | Roodenburg et al. | |
| 6,848,382 B1 | 2/2005 | Bekker | |
| 6,926,097 B1 | 8/2005 | Blake | |
| 7,131,388 B2 | 11/2006 | Moise, II et al. | |
| 7,189,028 B1 | 3/2007 | Signaroldi et al. | |
| 2004/0025777 A1 | 2/2004 | Werners et al. | |
| 2004/0115006 A1 | 6/2004 | Facey et al. | |
| 2004/0237841 A1 | 12/2004 | Brown et al. | |
| 2008/0237170 A1 | 10/2008 | Altman | |
| 2008/0237171 A1 | 10/2008 | Altman | |
| 2008/0237173 A1 | 10/2008 | Altman | |
| 2008/0237174 A1 | 10/2008 | Altman | |
| 2008/0237175 A1 | 10/2008 | Altman | |
| 2008/0240863 A1 | 10/2008 | Altman | |
| 2008/0243365 A1 | 10/2008 | Altman | |
| 2008/0247827 A1 | 10/2008 | Altman | |
| 2010/0067989 A1* | 3/2010 | Brown et al. | 405/196 |

FOREIGN PATENT DOCUMENTS

| | | | |
|---|---|---|---|
| FR | 2313256 A | 12/1976 | |
| FR | 2822890 A1 | 4/2002 | |
| FR | 2822890 A | 10/2002 | |
| GB | 2070541 A | 9/1981 | |
| GB | 2085814 A | 5/1982 | |
| GB | 2163402 A | 2/1986 | |
| GB | 2195443 A | 4/1988 | |
| GB | 2376442 A | 12/2002 | |
| GB | 2417844 A | 3/2006 | |
| NL | 7006149 A | 10/1970 | |
| NL | 8901924 A | 7/1990 | |
| WO | WO 2008/122898 A2 | 10/2008 | |
| WO | WO 2008/142575 A2 | 11/2008 | |
| WO | WO 2008/142578 A2 | 11/2008 | |
| WO | WO 2008/152512 A2 | 12/2008 | |
| WO | WO 2008/152516 A2 | 12/2008 | |
| WO | WO 2008/155664 A2 | 12/2008 | |
| WO | WO 2008/155667 A2 | 12/2008 | |
| WO | WO 2009/027825 A2 | 3/2009 | |

OTHER PUBLICATIONS

Press Release Jun. 11, 2002; Bollinger Delivers First of Two Large Liftboats to Superior Energy Services, Inc., Harvey, LA; http://www.bollingershipyards.com/june%2011%202002%20superior%20storm.htm; pp. 1-2; website print Feb. 7, 2008.

Hercules Offshore; Corporate Overview; http://www.herculesoffshore.com/overview.htm; pp. 1-2; website print Feb. 7, 2008.

Liftboat Ground-Breaker; Updstream; Anthony Guegel; Sep. 17, 2001; p. 1; http://www.oasesoffshore.com/press/septup172001.html; website print Feb. 7, 2008.

Marlinek.com; Jan. 25, 2008; Putting the "Lift" Into Liftboats; http:///www.marinelink.com/Story/Putting+the+%22Lift%22+into+Liftboats-10001.html; pp. 1-3; website print Jan. 25, 2008.

Marinelog.com; Golar LNG orders two more; http://www.marinelog.com/DOCS/NEWSMMI/MMIJuly19.html; Jul. 19, 2001; pp. 1-2; website print Feb. 7, 2008.

Montco Offshore; L/B Myrtle Class 245'; http:/www.montcooffshore.com/Liftboats/Myrtle/myrtle.htm; pp. 1-2; website print Feb. 7, 2008.

Oases Offshore; "Safely Rising to New Heights"; pp. 1-10.

Offshore, New Vessels, Rigs, Updates, Offshore—Aug. 2003; http://www.offshore-mag.com/articles/print_screen.cfm?ARTICLE_ID=185436; website print Feb. 7, 2008.

Superior Energy Services: Marine Services; http://www.superiorenergy.com/html/marine.html; website print Feb. 7, 2008.

David Reed et al: "Shallow Geohazard Risk Mitigation; A Drilling Contractor's Perspective" vol. IADC/SPE-74481, Feb. 28, 2002, p. 4, XP007906899, the whole document.

Roger Kee et al: "Geotechnical Hazards Associated with Leg Penetration of Jack-Up" Offshore South East Asia Conferecence and Echibition; vol. 5th Conf., Feb. 21, 1984; pp. 7/62-7/70, XP007906900, the whole document.

PCT International Search Report for International Application No. PCT/IB2008/002392.

PCT Written Opinion of the International Serching Authority for International Application No. PCT/IB2008/002392.

PCT International Search Report for International Application No. PCT/IB2008/002349.

PCT Written Opinion of the International Serching Authority for International Application No. PCT/IB2008/002349.

PCT International Search Report for International Application No. PCT/IB2008/002345.

PCT Written Opinion of the International Serching Authority for International Application No. PCT/IB2008/002345.

PCT International Search Report for International Application No. PCT/IB2008/002348.

PCT Written Opinion of the International Serching Authority for International Application No. PCT/IB2008/2348.

PCT International Search Report for International Application No. PCT/IB2008/002176.

PCT Written Opinion of the International Serching Authority for International Application No. PCT/IB2008/002176.

PCT International Search Report for International Application No. PCT/IB2008/002351.

PCT Written Opinion of the International Serching Authority for International Application No. PCT/IB2008/002351.

PCT International Search Report for International Application No. PCT/IB2008/002434.

PCT Written Opinion of the International Serching Authority for International Application No. PCT/IB2008/002434.

PCT International Search Report for International Application No. PCT/IB2008/002182.

PCT Written Opinion of the International Serching Authority for International Application No. PCT/IB2008/002182.

Chapter 2: Future Exploitation, Feb. 14, 2001, pp. 47-55, Schlumberger.

Bima MPSV Specifications, Jul. 2004, Schlumberger.

Introduction of a Mobile Jack-Up Service Unit "MJSU 300" into the South China Sea, Presentation by: Rich Altman, May 2002.

* cited by examiner

METHODS OF POSITIONING AN ELEVATING SUPPORT VESSEL

CROSS-REFERENCE TO RELATED APPLICATIONS

This application claims the benefit of U.S. Provisional Application No. 60/920,974 filed Mar. 30, 2007 and U.S. Provisional Application No. 61/030,815, filed Feb. 22, 2008.

FIELD OF THE INVENTION

This invention relates to methods of positioning improved marine vessels, and in particular to methods of locating a position to jack-up improved marine vessels for use in oil or gas field operations.

BACKGROUND OF THE INVENTION

Jack-up drilling rigs are typically employed for offshore energy exploration and development of offshore oil and gas fields. These drilling rigs generally float on a hull and have three or four extendable legs. In the typical situation, the drilling rig is pulled or towed to a location by one or more tug vessels. At the desired location, the drilling rig's legs are then extended to the ocean/sea floor, and the deck of the drilling rig is raised—or jacked up—out of the water. Preferably, the deck of the drilling rig is raised high enough to avoid any sea swells. The jacked-up deck of the drilling rig provides a stable structure in an environment from which a crew may perform drilling operations. These drilling rigs can withstand harsh weather conditions and may be deployed for long periods of time. Due to the nature of the work, deck space is limited and valuable.

Drilling rigs may have a cantilever system, atop which sits a fixed rig. In operation, a drilling rig is moved to a location near an oil or gas platform, a free-standing conductor, or a fixed conductor and jacked up. Then, the cantilever system is skidded out from the transom of the drilling rig and over the desired well. These cantilever systems, however, are stowed on the deck as a single unit, and take up a large portion of the limited space available.

Another type of vessel used in the oil and gas field is the derrick barge. Derrick barges are typically fitted with one or more cranes. Such cranes are typically mounted atop fixed and solid pedestals. The derrick barges, like jack-up drilling rigs, are typically pulled or towed to location. Unlike jack-up drilling rigs, however, derrick barges typically do not jack-up. Accordingly, derrick barges are subject to the pitch and roll of the sea/ocean. Thus, the derrick barge's ability to work offshore is limited by the environment in which they serve.

Yet another type of vessel used to facilitate offshore operations is a lift boat. Lift boats, like jack-up rigs, typically have three or four jack-up legs and may be elevated out of the water. Lift boats are considerably smaller than jack-up rigs, and are intended for short term deployment. These smaller vessels cannot withstand harsh weather conditions and are typically designed to move, under their own power and without the need for a tug boat, out of the way of bad weather. Accordingly, a lift boat is limited in its size and ability, and cannot function as a jack-up rig.

Additional features of the three above-identified vessels are illustrated in the following patents:

U.S. Pat. No. 4,483,644 to Johnson describes a cantilever mobile marine rig with hydraulic load equalizers. The rig includes a deck structure and a cantilever assembly skiddingly mounted on the deck structure. The hydraulic load equalizers distribute the stresses between the cantilever assembly and the structure.

U.S. Pat. No. 5,388,930 to McNease describes a method and apparatus for transporting and using a drilling apparatus or a construction crane apparatus from a single moveable vessel. In the McNease disclosure, a drilling apparatus of a construction crane apparatus is skidded onto the deck of a jack-up rig which is then floated to a remote location for use.

U.S. Pat. No. 6,257,165 to Danos, Jr. et al. describes a vessel with a movable deck. The vessel comprises a first and second pontoon, a first catamaran hull attached thereto, and a platform. The pontoons and catamaran hull float on the waters' surface, and cannot be raised. The platform is connected to the catamaran hull using jack-up legs. In this manner, the platform may be raised and lowered relative to the catamaran hull using a jacking mechanism. Danos, Jr. et al. further describes a first thruster nozzle attached to the first pontoon, the first thruster nozzle is attached in a 360 degree phase and a second thruster nozzle attached to the second pontoon, with the second thruster nozzle being movable in a 360 degree phase.

U.S. Pat. No. 6,200,069 to Miller describes a jack-up work platform. The work platform of Miller comprises a hovercraft vessel outfitted with several jack up legs. Miller states that the hovercraft can traverse environmentally sensitive terrain such as brackish and freshwater marshes without the need to dig canals that may cause or exacerbate salt water instruction. Once the drilling or exploration site is reached, the jack up legs may be lowered, lifting the work platform above the surface.

U.S. Pat. No. 6,607,331 to Sanders et al. describes a support structure for a lift crane, and in particular, to a lift crane jack-up structure, wherein the lift crane is positioned about a leg of the jack-up structure without relying upon the leg for structural support. The structure includes an above deck portion and a substructure situated below deck such that the jack-house is structurally integrated into the vessel.

U.S. Pat. No. 6,926,097 to Blake describes an offshore jack-up workover rig, which is detachably mounted on an extensible cantilevered frame. The cantilevered frame comprises a pair of parallel support beams mounted to the vessel. A pair of cantilever skid beams rests on the support beam. And, at least one hydraulic ram and cylinder is provided to drive the cantilever skid beam over the support beam.

U.S. Pat. No. 7,131,388 to Moise, II et al. describes a lift boat having recesses in the hull that receive the pads of the legs when the boat is underway. Moise, II et al. states that preferably, the total bottom surface area of the pads is preferably at least 30% of the surface area of the deck of the lift boat. Moreover, Moise describes that the total bottom surface area of the pad is large enough such that, when the boat is loaded and jacked up, the pads exert less than 7 psi on the sea floor. Moise further describes propelling the boat using two rear propellers and rudders.

Accordingly, what is needed is a modified vessel, which incorporates features of a jack-up drilling rig, a derrick barge, and a lift boat to meet the demanding requirements of offshore construction, maintenance, and demolition of oil and gas platforms, free-standing conductors, and/or fixed conductors. Preferably, the modified vessel has at least the stature of a jack-up rig with enhanced maneuverability. Further, a modified vessel having an improved crane support system which optimizes the use of deck space is needed. What is also needed is a modified vessel, which allows a work-over rig to be extended off of the transom of the modified vessel, or placed directly onto an offshore platform or structure, without taking up valuable deck space. Further needed is a removable extension system that does not take up valuable deck space. There is also a need for an improved method of selecting a location to jack-up a vessel in proximity to an offshore platform or structure, and a method of handing off a single well conductor from a jack-up rig to a modified vessel.

SUMMARY OF THE INVENTION

In accordance with one important aspect of the present invention a method of selecting a location to jack-up an Elevating Support Vessel is provided, which includes moving the Elevating Support Vessel within proximity to an offshore structure, mapping at least a portion of the sea floor near the offshore structure, using the mapped portion of the sea floor to determine a jack-up location, moving the Elevating Support Vessel to the determined jack-up location; and jacking-up the Elevating Support Vessel. Preferably, when need be, the step of jacking-up the Elevating Support Vessel includes a method of holding station. Preferably, when need be the step of jacking-up the Elevating Support Vessel includes a method of mooring.

Those skilled in the art will further appreciate the above-mentioned advantages and superior features of the invention together with other important aspect thereof upon reading the detailed description which follows in conjunction with the drawings.

BRIEF DESCRIPTION OF THE DRAWINGS

For a further understanding of the nature and objects of the present inventions, reference should be made to the following detailed disclosure, taken in conjunction with the accompanying drawings, in which like parts are given like reference numerals. The drawing figures are not necessarily to scale and certain features of the invention may be shown exaggerated in scale or in somewhat schematic form in the interest of clarity and conciseness, wherein.

DISCLOSURE OF THE INVENTIONS

Definitions

In an embodiment, the terms "horizontal axis" or "horizontal" mean a direction along the length of a vessel from the transom of the vessel to the bow of the vessel.

In an embodiment, the terms "vertical axis" or "vertical" mean a direction along the width of a vessel from the port of the vessel to the starboard of the vessel.

In an embodiment, the terms "depth axis", "depth", or "deep" mean a direction along the depth of a vessel from the bottom of the vessel to the top of the vessel.

In an embodiment, the term "still water line" means the level of the water without wind or other disturbances which artificially impacts the level of the water, such as the wake from another vessel.

In an embodiment, the term "air gap" means the distance from the lowest portion of the hull of a vessel to the still water line.

In an embodiment, the term "self propelled" or "self propelled vessel" means a vessel that is capable of navigating open waters without the assistance of any other vessel, such as a tug boat.

In an embodiment, the term "hold station" or the term "holding a vessel in station" means that the vessel has the ability to remain within a 3 meter radius of its position during flotation.

In an embodiment, the term "Elevating Support Vessel" is defined as any vessel having at least a hull and deck, at least three jack-up legs capable of extending through the hull and deck, and at least three azimuthing thrusters, wherein the vessel is self propelled.

In an embodiment, the term "light ship" means the weight of the ship including its fixed components such as cranes, engines, and the like apparatus permanently affixed to the vessel.

In an embodiment, the term "full displacement" means the light ship weight plus the weight of variable loads and consumables such as fuel, water, deck cargo, personnel and the like objects.

For the purposes of this disclosure, wherein a measurement of distance, length, or thickness is discussed the mean distance, length, or thickness is implied, unless otherwise indicated or unless would be otherwise understood by one of ordinary skill in the art. For example, wherein thickness of a section is discussed the mean thickness across the section is implied.

For the purposes of this disclosure, all measurements disclosed herein are at standard temperature and pressure, at sea level on Earth, unless indicated otherwise.

Figure 1:
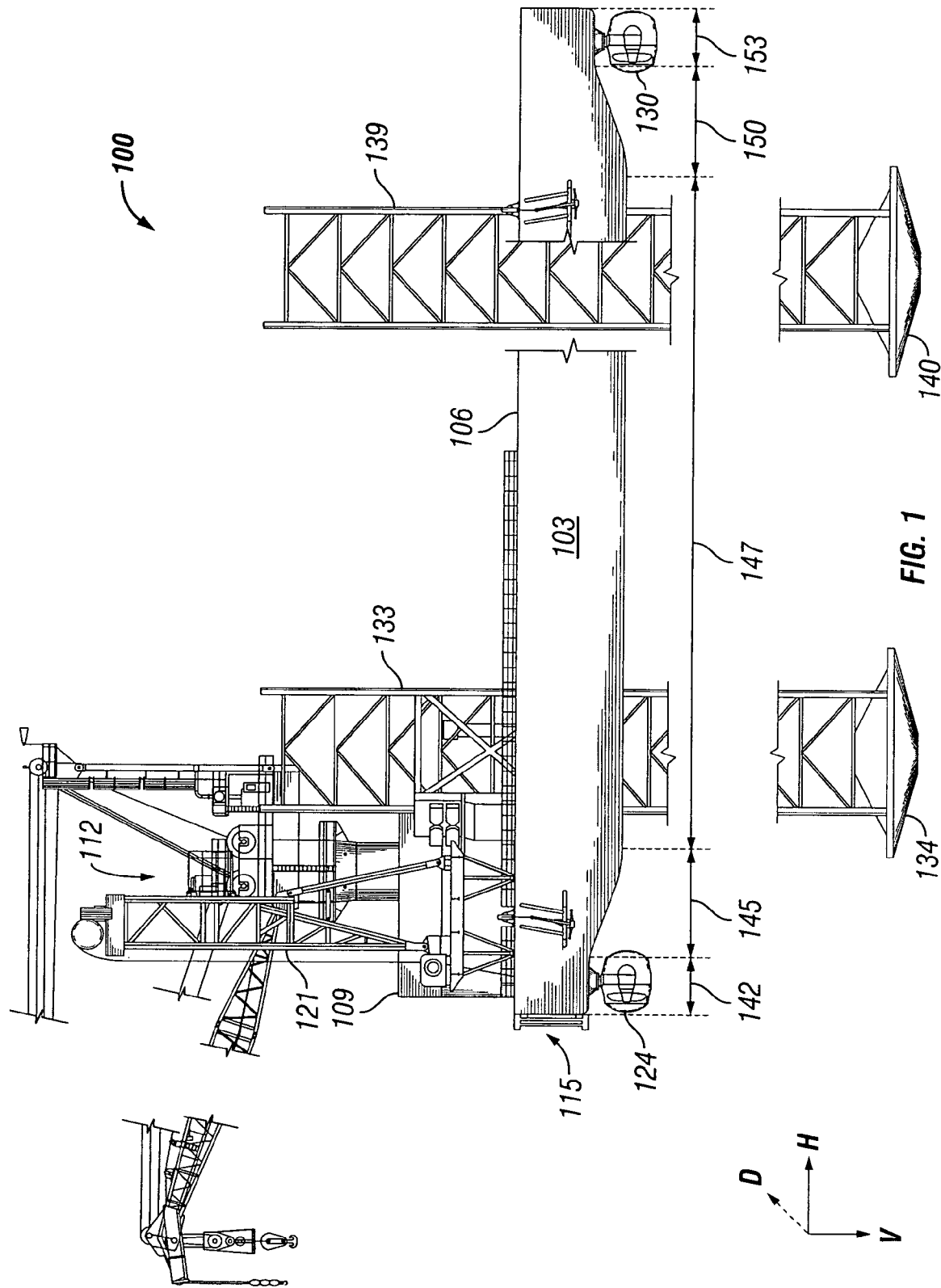
FIG. 1 is a side, partially cut-away, view of an exemplary Elevating Support Vessel having a crane disposed on a crane support of the present invention, three thrusters of the present invention, and a stowed extension bridge and work-over rig assembly of the present invention.
Figure 2:
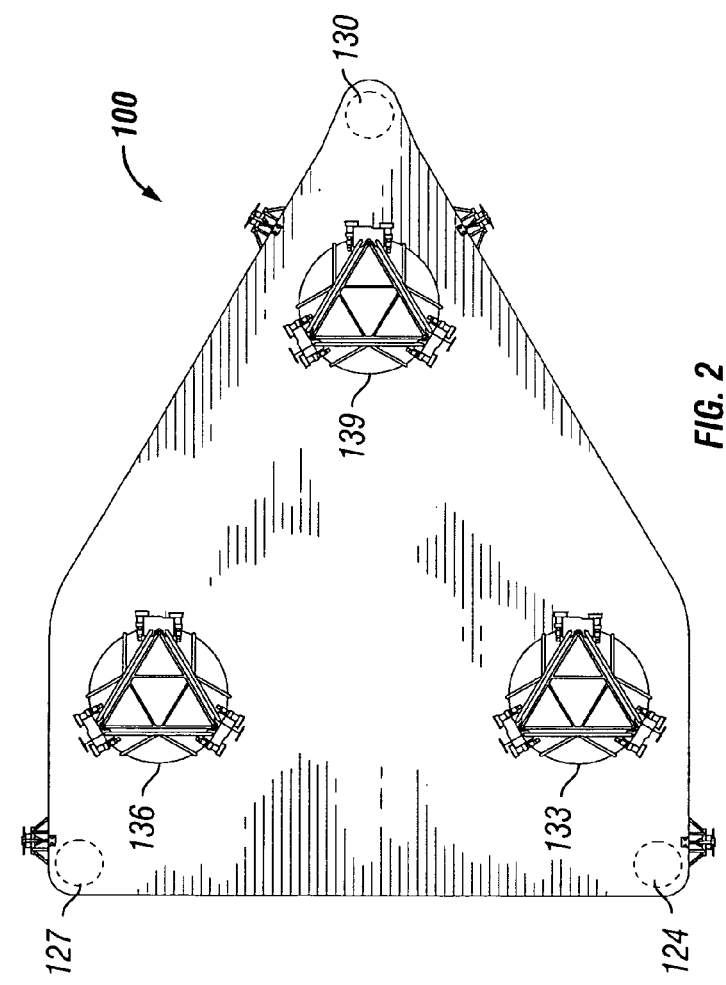
FIG. 2 is a top-down, partially cut away, view of the exemplary Elevating Support Vessel showing the location of the three thrusters of the present invention.

FIG. 1 illustrates one embodiment of an Elevating Support Vessel 100. The Elevating Support Vessel 100, of FIG. 1, has a hull 103, a deck 106, a crane support 109, a crane 112, at least one extension beam 115, a work-over rig 121, three thrusters 124, 127, and 130, three jack-up legs 133, 136, and 139, and three spud cans 134, 137, and 140; however, due to the position of the Elevating Support Vessel 100 only two thrusters 124 and 130, two jack-up legs 133 and 139, two spud cans 134 and 140, and one extension beam 115 are shown. For clarity of understand, FIG. 1 also illustrates the above-defined orientations, wherein H stands for the horizontal axis, V stands for the vertical axis, and D stands for the depth axis. FIG. 2 is a top-down view of the Elevating Support Vessel 100, and illustrates the locations of the three thrusters 124, 127, and 130 and the three jack-up legs 133, 136, and 139.

Vessel Hull and Dimensions

The hull 103 of the Elevating Support Vessel 100 may be thought of as subdivided into five sections: a transom section 142, a sloped transom section 145, a center section 147, a sloped bow section 150, and a bow section 153. Preferably, at least a portion of the lower side of the transom section 142 is flat. Likewise, preferably at least a portion of the lower side of the bow section 153 is flat. In this manner, thrusters 124, 127, and 130 may be mounted, respectively, to the flat lower sides of the transom section 142 and bow section 153. The transom section 142 and the bow section 153 are of a relatively thinner depth than the center section 147. In one embodiment of the Elevating Support Vessel 100, the transom section 142 and the bow section 153 are at least half as deep as the center section 147. The center section 147 may be of a uniform curvature or generally flat. Preferably, the center section 147 has additional slopes (not shown) to accommodate the spud cans 134, 137, and 140.

The sloped transom section 145 and the sloped bow section 150 are of a length along the depth and horizontal axes and angle sufficient such that the thrusters 124, 127, and 130 may be mounted with the necessary. Preferably, the angle of the sloped transom section 145 and the sloped bow section 150 with respect to the bottom of the hull is sufficient to allow efficient flow of water through the thrusters. In one embodiment, the angle of the sloped transom section 145 and the sloped bow section 150 with respect to the bottom of the hull will vary depending on the requirements of the thrusters. For example, the angle of the sloped transom section 145 and the sloped bow section 150 with respect to the bottom of the hull is preferably between about 15 and about 30 degrees, alternatively between about 17 and about 25 degrees, alternatively between 18 and 22 degrees, and alternatively about 20 degrees.

Figure 1A:
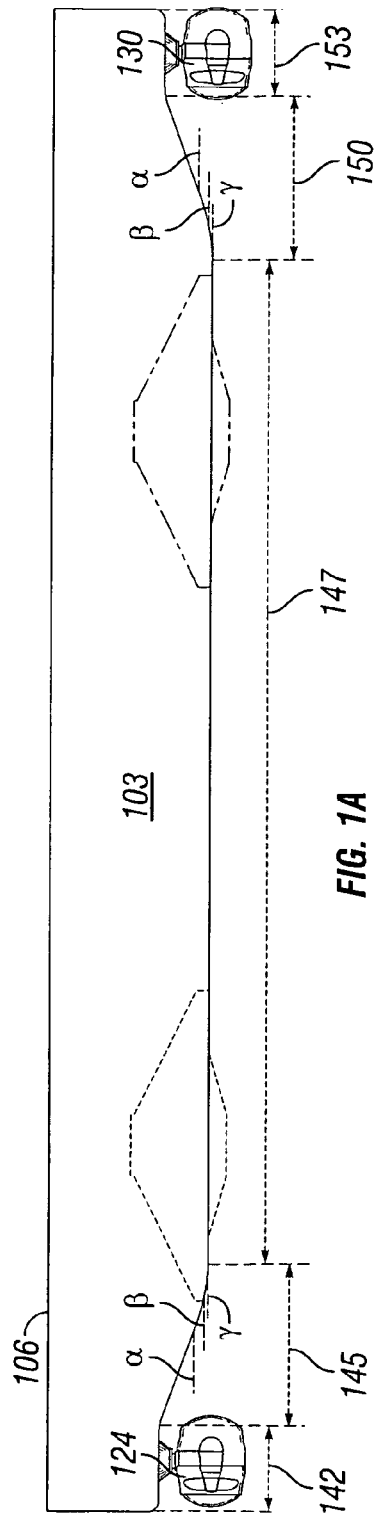
FIG. 1A is a side, partially cut-away, view of an alternative Elevating Support Vessel.

With respect to FIG. 1A, and in an alternative embodiment, the sloped transom section 145 and the sloped bow section 150 comprise a series of graduated slopes. In a preferred embodiment, the sloped transom section 145 and the sloped bow section 150 each comprise an alpha slope, a beta slope, and a gamma slope. The alpha slope is preferably of such an angle to allow sufficient water flow into the thrusters 124, 127, (not shown) and 130. The alpha slope will have an angle generally dependent upon the size of the thrusters 124, 127, (not shown) and 130 and the length of the hull. In an embodiment, the alpha slope is between about 15 and about 25 degrees, preferably about 20 degrees. The beta slope is preferably of an angle lesser than the alpha slope. In this manner, the beta slope acts as a transition slope between the alpha slope and gamma slope, and reduces the stress on the hull. In an embodiment, the beta slope is between about 10 and about 15 degrees, and preferably about 13 degrees. The gamma slope is preferably of an angle lesser than the beta slope. In this manner, the gamma slope acts as a transition slope between the beta slope and the center section 147, and reduces the stress on the hull. In an embodiment, the gamma slope is between about 5 and about 10 degrees, and preferably about 6 or about 7 degrees.

Continuing with reference to FIG. 1A, all edges and/or corners of the hull 103 are radial, or rounded. Without wishing to be bound by the theory, it is generally thought that the hull having radial edges reduces drag and is more hydrodynamic.

The hull 103 of the Elevating Support Vessel 100 is preferably made of 355 MPa steel. In an embodiment, the hull 103 of the Elevating Support Vessel 100 is from about 5 to about 15 meters deep, and preferably about 7.5 meters deep from the lowest point until the deck 106 of the Elevating Support Vessel 100. At full displacement the air gap is preferably about 11 meters, alternatively about 12.5 meters, alternatively about 13.5 meters, and alternatively about 15.5 meters.

In an embodiment, the Elevating Support Vessel 100 weighs about 6,800 metric tons at light ship. In this embodiment, the Elevating Support Vessel exerts a minimum of about 345 kilopascals per leg on the sea floor. The Elevating Support Vessel 100 may vary in weight from about 4,500 metric tons to about 11,000 metric tons at light ship. Alternatively, the Elevating Support Vessel 100 may vary in weight from about 6,800 metric tons to about 15,500 metric tons at full ship, and preferably from about 9,000 metric tons to about 13,500 metric tons.

Jack-up Legs

The three jack-up legs 133, 136, and 139 may have a lattice, truss, or tubular configuration. Preferably, the jack-up legs 133, 136, and 139 may withstand greater than about 5 meter waves, alternatively greater than about 10 meter waves, and more preferably, greater than about 15 meter waves. The jack-up legs 133, 136, and 139 may withstand greater than about 50 knot winds, preferably greater than about 75 knot winds, and most preferably greater than about 100 knot winds. The jack-up legs 133, 136, and 139 may be able to withstand a wave period of about 13.5 seconds. The dimensions of the jack-up legs 133, 136, and 139 may vary depending on many factors, including the location of the platform or wells to be serviced. In an embodiment, the jack-up legs 133, 136, and 139 have an overall leg length of at least 100 meters, alternatively about 127 meters, an about 2.7 meter safety zone, a 7.5 meter leg tower, and an estimated sea bed penetration of about 3 to about 8.3 meters. This embodiment may yield a working water depth of from about 60 meters to about 90 meters, and alternatively a working water depth of from about 60 meters to about 75 meters.

Azimuthing Thrusters

With reference to FIG. 1, FIG. 1A, and FIG. 2, two of the azimuthing thrusters 124 and 127 are mounted to the underside of the transom section 142 and along the horizontal axis behind the two rear jack-up legs 133 and 136. The two rear azimuthing thrusters 124 and 127 may be mounted along the vertical axis of the transom section 142 in a position to avoid the turbulence created by the drag of the rear jack-up legs 133 and 136, and give the greatest maneuverability to the Elevating Support Vessel 100. To increase maneuverability, it is preferred that the two rear azimuthing thrusters 124 and 127 are placed as far apart along the vertical axis as possible, however, in an embodiment, the two rear azimuthing thrusters 124 and 127 may be placed along the vertical axis of the transom between the two rear jack-up legs 133 and 136. It is also preferred that the two rear azimuthing thrusters 124 and 127 are mounted in a location such that at least a portion of the two rear azimuthing thrusters 124 and 127 extend below the hull 103 of the Elevating Support Vessel 100. In this manner, there is a greater chance that the water flow through the thrusters 124 and 127 is laminar as opposed to turbulent.

Continuing with reference to FIG. 1, FIG. 1A, and FIG. 2, the front azimuthing thruster 130 is preferably mounted to the underside of the bow section 153. Preferably, the front azimuthing thruster 130 is mounted ahead of the front jack-up leg 139 along the horizontal axis. In this manner, the front azimuthing thruster 130 avoids the turbulence created by the front jack-up leg 139. However, in an alternative embodiment, the front azimuthing thruster 130 may be mounted behind the front jack-up leg 139 along the horizontal axis. The front azimuthing thruster 130 is preferably mounted in a location to provide the Elevating Support Vessel 100 the greatest maneuverability. In an embodiment, the front thruster 130 is mounted in a location along the center of the bow section 153 along the vertical axis and toward the front-most portion of the Elevating Support Vessel 100 along the horizontal axis. The front azimuthing thruster 130 is also preferably mounted in a location such that at least a portion of the front azimuthing thruster 130 extends beyond the hull 103 of the Elevating Support Vessel 100. In this manner, there is a greater chance that the water flow through the front thruster 130 is laminar as opposed to turbulent.

In an alternative embodiment (not shown), there are two front azimuthing thrusters. In this embodiment, the bow of the Elevating Support Vessel 100 is widened—with respect to the configuration shown in FIG. 2—along the vertical axis to such that two front azimuthing thrusters may be mounted parallel along the vertical axis. The bow is also widened such that each of the front azimuthing thrusters may be mounted to the bow of the Elevating Support Vessel 100, along the vertical axis, such that their exhaust straddles the front jack-up leg 139. The two front azimuthing thrusters are preferably mounted to the bow of the Elevating Support Vessel 100, along the horizontal, at a generally front-most location.

The azimuthing thrusters 124, 127, and 130 may be any commercially available azimuthing thruster, which may be affixed to the Elevating Support Vessel 100 and provide sufficient horsepower and maneuverability such that the Elevating Support Vessel 100 is self-propelled. Preferably the azimuthing thrusters 124, 127, and 130 are capable of producing between 500 and 4,000 kilo-watts of power, alternatively about 2,500 kilo-watts of power. For example, the thrusters may be SP 35 azimuthing thrusters having a ducted propeller, available from Steerporp Ltd., located in Rauma, Finland. The Elevating Support Vessel 100 may have a maximum speed of from about 5 knots to about 10 knots, or greater than about 7 knots.

Crane Support and Crane

Figure 3:
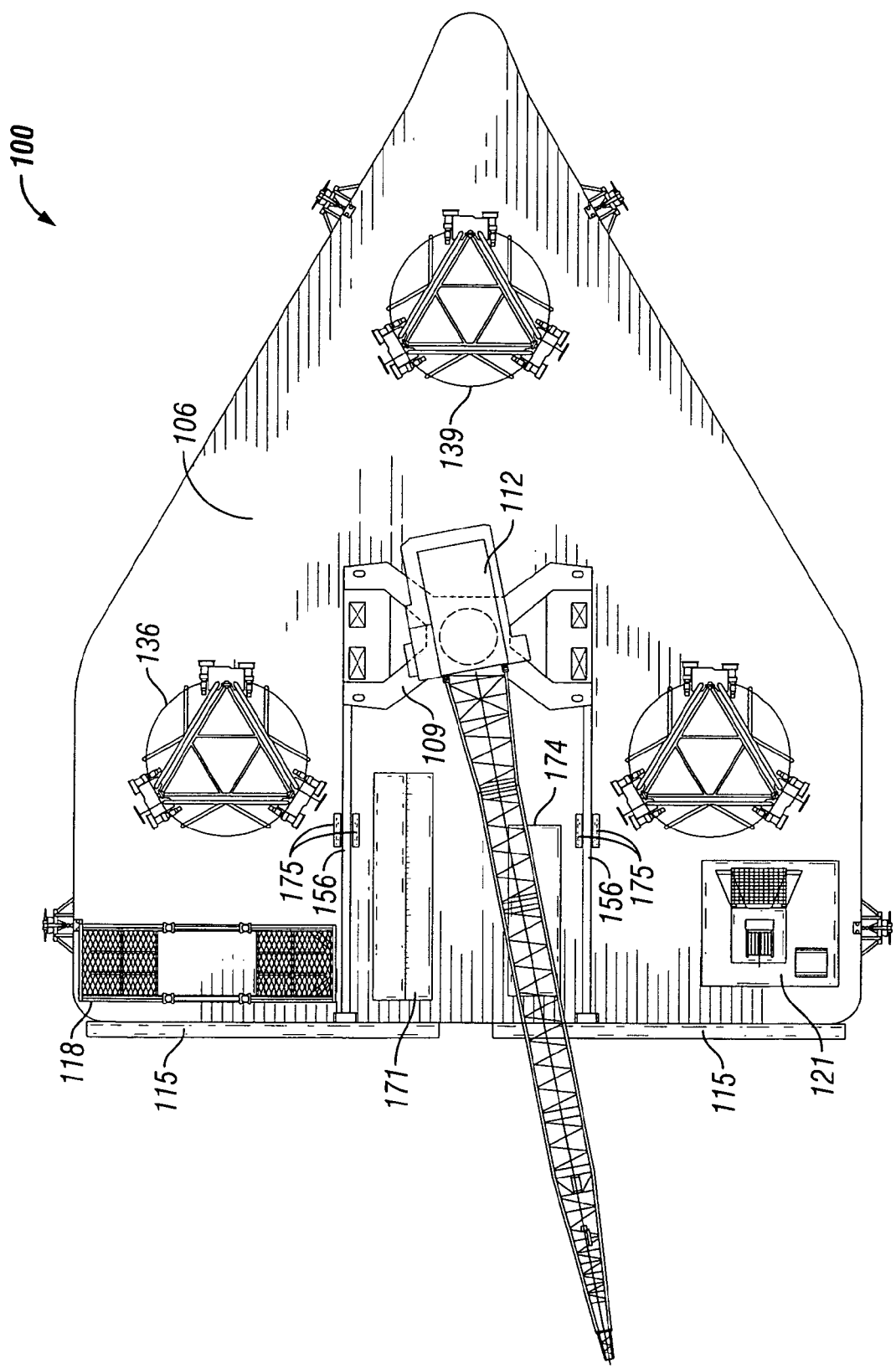
FIG. 3 is a top-down view of the exemplary Elevating Support Vessel having the crane disposed on the crane support of the present invention, showing the tracks along which the crane support moves, and showing a stowed extension assembly.
Figure 4:
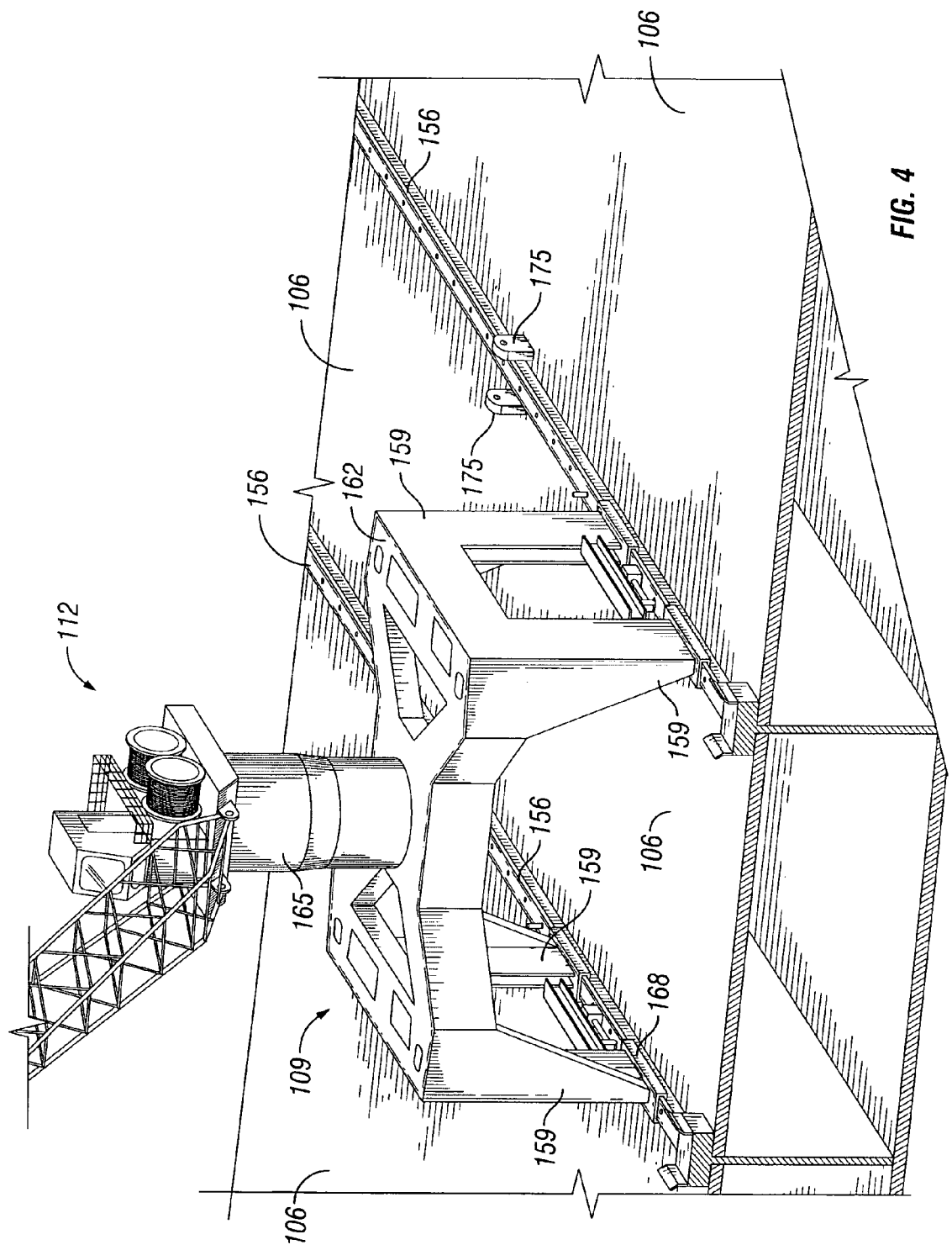
FIG. 4 is a front view of the crane disposed on the crane support of the present invention.
Figure 8:
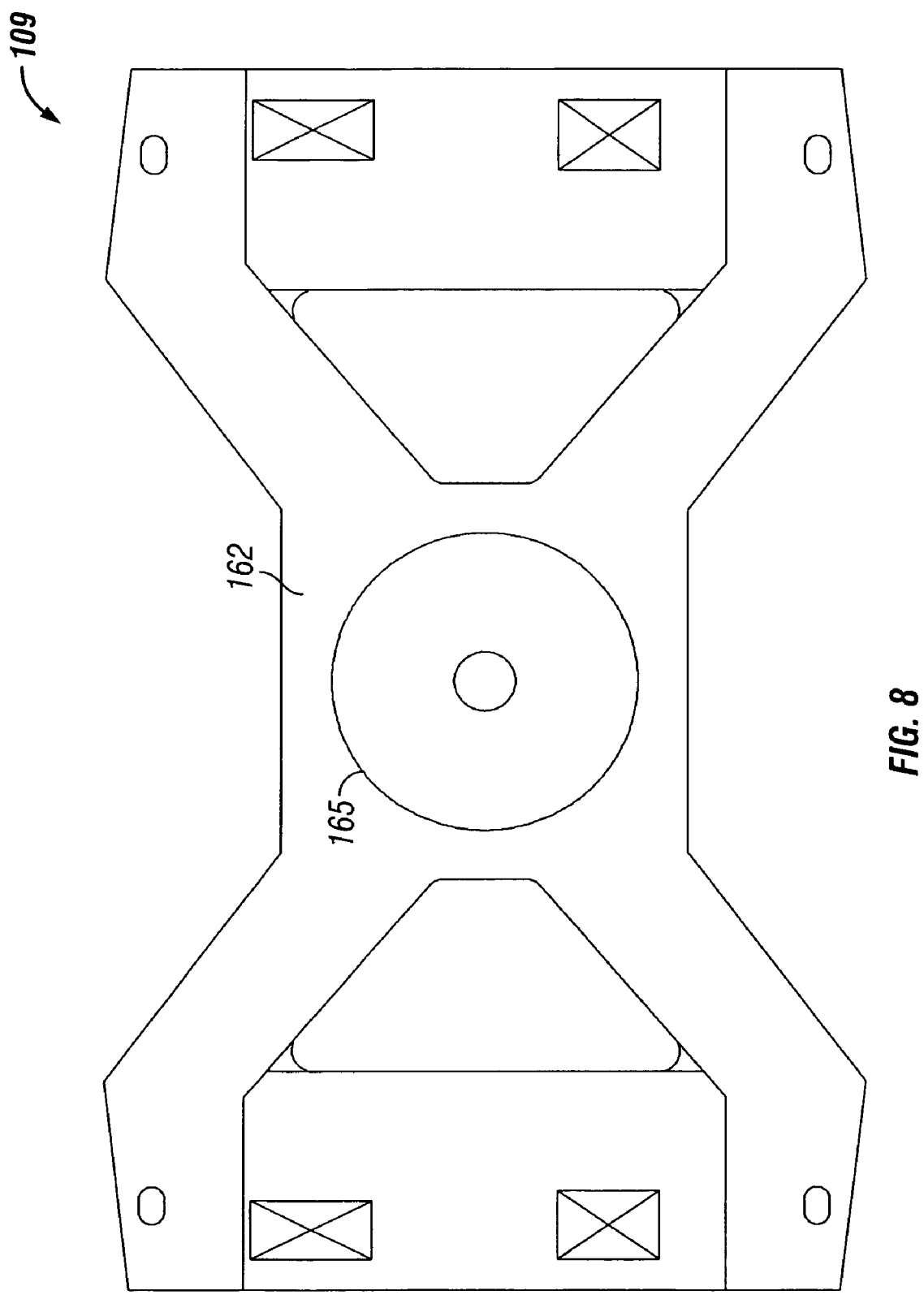
FIG. 8 is a top-down view of the crane support.

FIGS. 3, 4, and 8 illustrate a crane support 109, a crane 112, and tracks 156 disposed on the deck 106 of an Elevating Support Vessel 100. The crane support 109 must be of a size and strength to support the crane 112. The crane support 109 is a table-like structure having at least two crane-support legs 159, preferably four crane-support legs 159, and a crane-support platform 162. The crane-support legs 159 are attached to the crane-support platform 162 at one end. Preferably, the crane-support legs 159 are welded to the crane-support platform 162. At the other end, the crane-support legs 159 are attached to the tracks 156, alternatively the crane-support legs 159 are attached to crane-leg shoes 168. The connection between the crane-support legs 159, crane-leg shoes 168, and the tracks 156 is discussed in more detail below. The crane-support legs 159 are of a length such that the lower side of the crane-support platform 162 is at least about 2 meters for example about 3 meters, from the deck 106. Alternatively, the crane-support legs 159 are of a length such that the lower side of the crane-support platform 162 is at least about 6 meters from the deck 106. In yet another embodiment, the crane-support legs 159 are of a length such that the lower side of the crane-support platform 162 is at least about 9 meters from the deck 106.

The crane-support legs 159 may be triangular shaped with the top end of the leg being thicker than the bottom end of the leg. The crane-support legs 159 may be made of double girder steel, alternatively an I shaped steel beam may be used. The crane-support platform 162 may be generally rectangular or square shape, and is preferably a lattice of support beams designed to be light-weight yet strong.

A crane-support column 165 is connected at one end to the crane-support platform 162. Preferably, the crane-support column 165 is welded into the center of the crane-support platform 162. In this manner, the weight of the crane 112 is distributed as evenly as possible across the crane-support structure 109. The crane 112 is rotatably affixed to the other end of the crane-support column 165. By rotatably affixed it is meant that the connection between the crane 112 and the crane-support column 165 permits the crane 112 to rotate about the radius of the crane-support column 165 from a first location to a second location.

The crane support 109, and its components, may weigh from about 150 metric tons to about 300 metric tons, and more preferably about 170 metric tons. The crane support 109, and its components, are preferably made of steel, and are more preferably 355 MPa medium strength steel.

The crane 112 may vary generally in size, and preferably has a 280 metric ton capacity at 20 meters. Alternatively, the crane has at least a 50 metric ton capacity at 20 meters, alternatively at least a 100 metric ton capacity at 20 meters, alternatively at least a 200 metric ton capacity at 20 meters, alternatively at least a 300 metric ton capacity at 20 meters, alternatively at least a 350 metric ton capacity at 20 meters, and alternatively at least a 500 metric ton capacity at 20 meters. A suitable crane 112 is a PC 250HD crane, which is commercially available from Australia Favelle Favco Cranes Pty. Ltd., located in Australia.

Crane Support Tracks

The tracks 156 may vary in length, but preferably run along the horizontal axis from the rear of the transom to a location generally behind the rear jack-up legs 124 and 127. In an embodiment, the tracks run along the horizontal axis from the rear of the transom to a length of about 20 meters, alternatively about 15 meters, alternatively about 10 meters. The tracks 156 are spaced apart from one another, along the vertical axis, at a distance such that the crane-support platform 162 may be large enough to evenly and safely distribute the weight of the crane 112 under load. Additionally, the tracks 156 are spaced apart from one another, along the vertical axis, at a distance such that there is room to store a variety of equipment and things beneath the crane-support platform 162 and between the tracks 156. The tracks 156 may be about 10 meters apart, along the vertical axis, alternatively about 15 meters apart, alternatively about 20 meters apart, alternatively about 25 meters apart. The tracks 156 must be sturdy to carry the weight of the crane-support 109, crane 112, and load. Accordingly, the tracks 156 preferably extend through the entire depth of the transom and are integral with the Elevating Support Vessel 100. Applicants believe, without wishing to be bound by the theory, that the tracks 156 absorb little to no dynamic moments or forces. Instead, the connection between the crane-support legs 159 and the track 156 permits the forces to be distributed in simple static directions.

Figure 5:
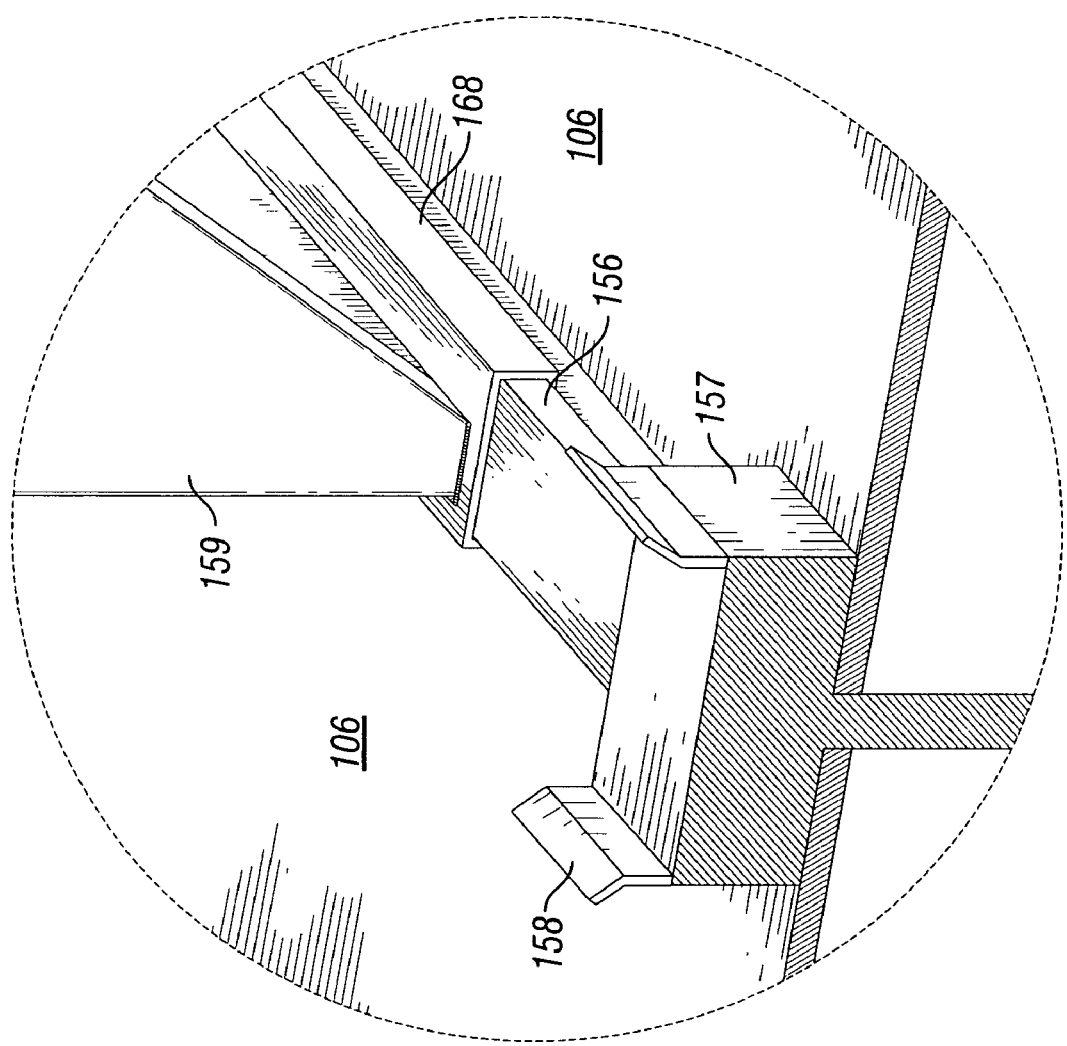
FIG. 5 is a front view of the T connection connecting the leg of the crane support with the track.

The connection between the track 156 and the crane-support legs 159 is described with reference to FIG. 5. The crane-support legs 159 may be secured to crane-leg shoes 168. The track 156 may be of a general T-shape, wherein the post of the T extends through the transom 142 of the deck 106. The top of the T-shaped track 156 is in communication with the crane-leg shoe 168, which is of a female shape designed to fit about the top of the T-shaped track 156. There must be enough space between the top of the T-shaped track 156 and the crane-leg shoe 168 such that the crane support 109 may slide along the track. In a preferred embodiment, there is about a 3 millimeter gap between the top of the T-shaped track 156 and the crane-leg shoe 168. The T-shaped portion of the track 156 may be between about 30 centimeters and about 60 centimeters in width, and preferably about 40 centimeters.

In an embodiment, the track 156 includes at one end, alternatively at either end, a stop 157. The stop 157 prevents the crane-leg shoe 168 from sliding off the track 156. The stop 157 is preferably from about two to three times as wide as the track 156, and in an embodiment about 1 meter. Preferably the stop 157 is from about 40 centimeters to about 80 centimeters in length, and preferably about 60 centimeters. The stop 157 may run the depth from the deck 106 to the top of the T-shaped portion of the track 156, alternatively the stop 157 may extend below the deck 106, or be shallower than the depth from the deck 106 to the top of the T-shaped portion of the track 156. The stop 157 may have protrusions 158 extending in the depth axis about eight to about 20 centimeters, preferably about 10 centimeters. The protrusions 158 preferably extend straight up along the depth axis, may be sloped away from each other, or extend up some distance and then slope away from each other.

In this manner, the crane 112 may be used in a number of ways. The crane 112 may be moved by skidding the crane support 109 across the tracks 159. The crane 112 may pick up a load from any point along the track 159. Thus, the crane 112 may pick up a load of the deck 106 of the Elevating Support Vessel 100, or from a location outside of the Elevating Support Vessel 100. The crane 112 may also be rotated 360° about the crane-support column 165 while under full load. The crane 112 may also be skidded along the tracks 159 while under load. Accordingly, the crane 112 may transport load or erect load in a self-contained manner, without need for any additional support vessels. The crane 112 has the additional benefit of allowing for the storage of equipment and things beneath the crane support 109. Because of the high clearance of the crane-support platform 162, the storage of equipment and things will not obstruct the movement of the crane 112. Additional uses of the crane 112 are discussed below.

Extension Assembly and Methods Thereof

Figure 6:
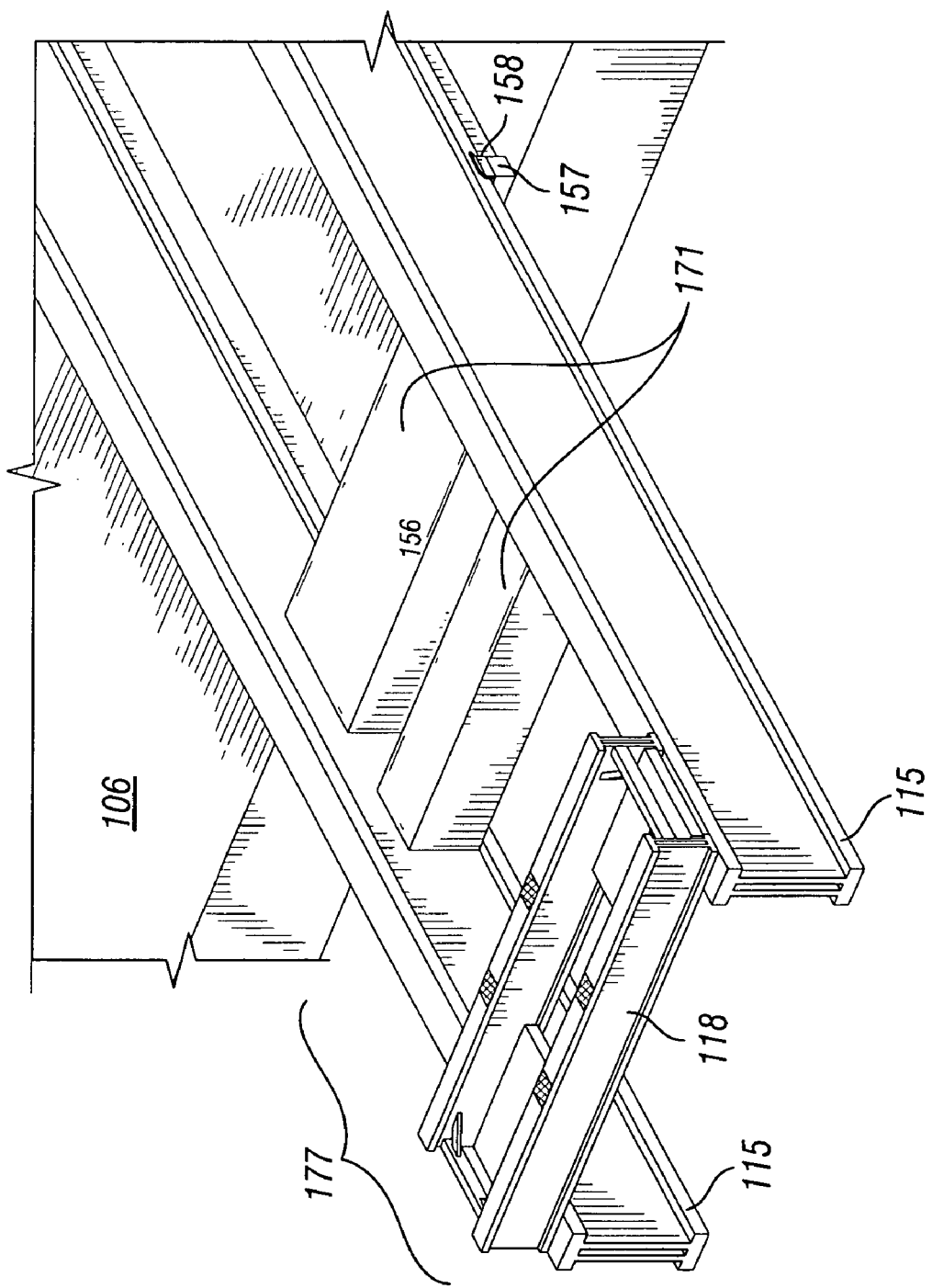
FIG. 6 is a side view the extension assembly prior to the installation of a work-over rig.
Figure 7:
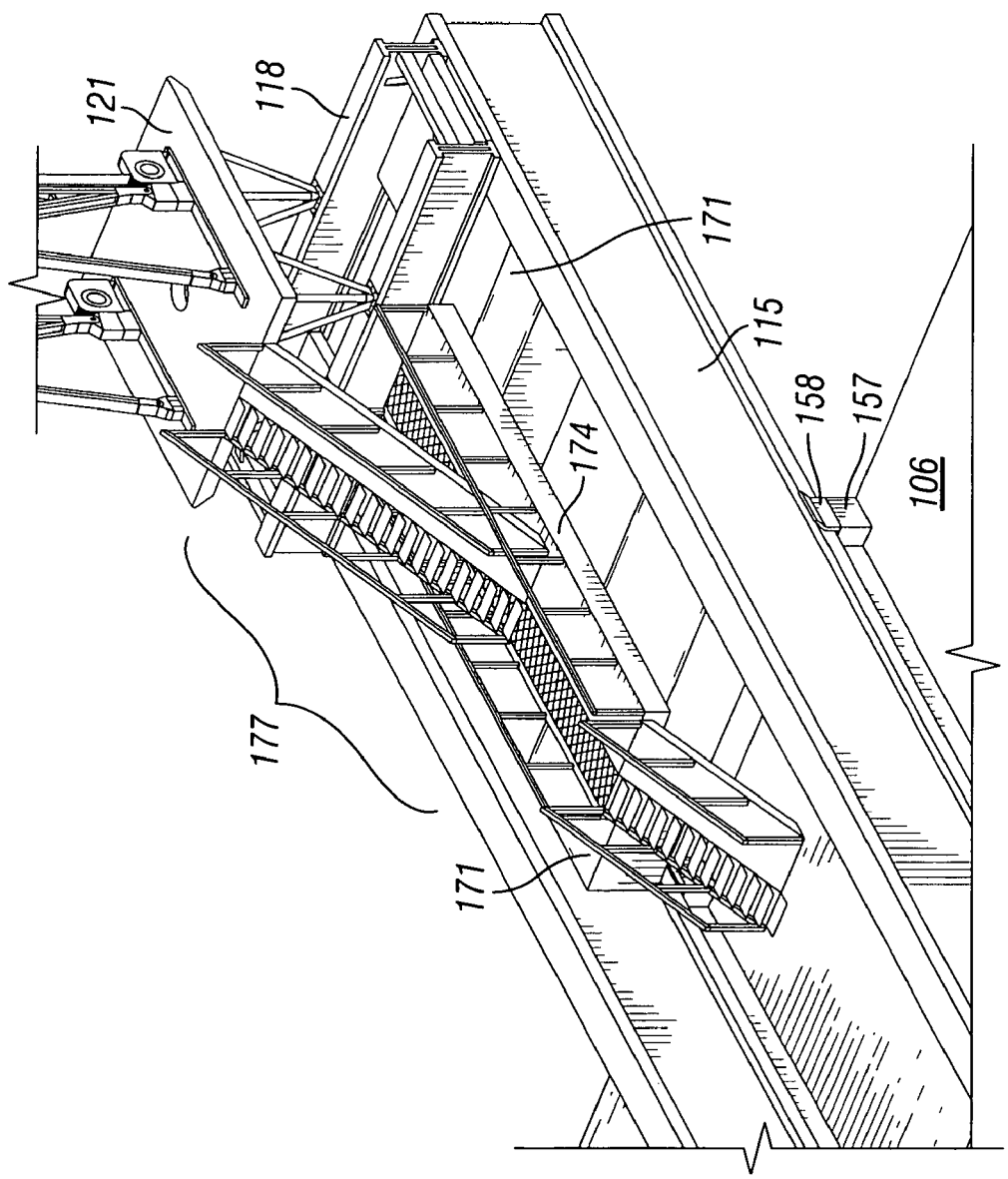
FIG. 7 is a front view of an exemplary and installed extension assembly.

The extension beams 115, modular traverse beam 118, work-over rig 121, modular tanks 171, and pipe bridge 174 are described with reference to FIGS. 3, 6 and 7. When assembled, the extension beams 115, modular traverse beams 118, modular tanks 171, and optionally pipe bridge 174 form an extension assembly 177 on top of which may be placed a work-over rig 121. The extension assembly 177 and work-over rig 121 may be positioned over an oil and gas satellite, platform, well or structure such that the workover rig 121 may be employed. Preferably, the extension assembly 177 supports the entire weight of the work-over rig 121 and relating equipment such that relatively little to no weight is transferred to the oil and gas satellite, platform, well or structure.

The extension beams 115 are preferably stowed on the rear of the Elevating Support Vessel 100 while it not in use. The extension beams 115 may be connected to the rear of the Elevating Support Vessel 100 by any of a variety of suitable means, including, pins, hooks, straps, and the like. In this manner, the extension beams 115 do not take up valuable deck space. Preferably there are two extension beams 115, however, any number of extension beams 115, preferably from one to about six, may be stowed off of the rear of the Elevating Support Vessel's 100 transom. The size of the extension beams 115 will vary depending on the size of the Elevating Support Vessel's 100 transom, the distance that the tracks 156 are spaced apart from one another along the vertical axis, among other factors; however, the extension beams 115 are preferably each from about 20 meters to about 35 meters long, from about 0.5 to about 1.5 meters wide, and about 2.5 meters to about 4 meters high. The extension beams 115 are preferably double girder steel beams, and alternatively steel I beams.

The extension beams 115 may engage the tracks 156 of the Elevating Support Vessel 100 by being pinned thereto, alternatively, the extension beams 115 may be designed to engage the T-shape of the tracks 156 in a manner similar to the communication between the crane-leg shoe 168 and the T-shape of the tracks 156. Preferably, there are two extension beams 115 and one is engaged with each of the tracks 156. In this manner, both extension beams 115 extend along the horizontal axis of the Elevating Support Vessel 100, and beyond the transom of the Elevating Support Vessel 100; however in another embodiment the tracks 156 and extension beams 115 may be configured such that the extension beams 115 extend off of the Elevating Support Vessel 100 in a vertical axis. In these embodiments, any weight loaded onto the extension assembly 177 is distributed evenly throughout the hull of the Elevating Support Vessel 100.

In a still further embodiment the extension beams 115 are laid on top of the tracks 156, along the horizontal axis, and thus engage the tracks. In this embodiment, the width of the extension beams 115 is less than the width of the stop 157. In this manner, the protrusions 158 of the tracks 156 prevent the extension beams 115 from moving along the vertical axis. Preferably the protrusions 158 are spaced such that the extension beams 115 fit snuggly there between. Spacers (not shown) may be employed between the protrusions 158 and extension beams 115 as necessary to ensure a snug engagement. The extension beams 115 may be affixed to moment plates 175, located along the tracks. The moment plates 175 preferably extend through the entire depth of the transom. The moment plates 175 stand taller than the tracks 156 such that a pin, preferably about 20 centimeters in diameter, may secure the extension beam 115 to the moment plate 175, and thus prevent movement of the extension beams 115 about the depth and vertical axes. Alternatively, a truss (not shown) may connect the extension beams 115 to each other at the distal end off of the Elevating Support Vessel 100 to add stability.

The modular traverse beam 118, work over rig 121, modular tanks 171, and pipe bridge 174 are preferably stowed on the deck of the Elevating Support Vessel 100 during transport and lift-up. The modular traverse beam 118 is designed to be perpendicularly fitted to both of the extension beams 115 when the extension beams 115 are engaged with its respective track 156. Preferably the modular traverse beam 118 is engaged with the extension beams 115 after the extension beams 115 are pinned to their respective moment plates 175. In this position, the modular traverse beam 118 acts as a skid on top which the workover rig 121 will be seated. The modular traverse beam 118 and extension beams 115 are preferably designed such the modular traverse beam 118 may skid, or be jacked, along the extension beams 115 in a first direction, preferably along the horizontal axis. The modular traverse beam 118 is also preferably designed such that the work over rig 121 may skid, or be jacked, along the modular traverse beam 118 in a second direction, preferably along the vertical axis. Preferably the skidding systems that move the modular traverse beam 118 along the extension beams 115, and the work over rig 121 along the modular traverse beam 118 are hydraulic jacking systems. The skidding system that moves the modular traverse beam 118 along the extension beams 115 may be the same or different system that moves the work over rig 121 along the modular traverse beam 118. The modular traverse beam 118 is preferably of a size and shape sufficient to support at least a 50 metric ton work over rig, and provide an observational platform.

The modular traverse beam 118 is preferably an I beam or double girder beam such that the feet of each beam may act as a rail, along which a sled may be skidded, rolled, or jacked. The sled may hold various equipment. In an example a blowout preventer may be placed in the sled and passed underneath the workover rig 121. Preferably, the sled comprises a test stump, catch basis, handrails and a traverse roller system. The blowout preventer may be any commercially available item. Suitable blowout preventers are available from Sunnda LLC, in Houston, Tex. Additionally, a platform, or platforms may be affixed, preferably welded or pinned, to the feet of each beam such that persons may walk safely.

The work-over rig 121 may be any standard rig adapted to be connected to the modular traverse beam 118, and is preferably designed with the capability of racking drill-pipe, work string, completion strings in singles, doubles, or triples configuration having a total capacity of at least about 50, alternatively at least about 100 metric tons, alternatively about 200 metric tons, and alternatively up to about 250 metric tons. In an embodiment, the work-over rig comprises a vertically telescoping mast and drawworks with a capacity of at least about 50, alternatively between about 30 and 350, alternatively about 250 metric tons. In an embodiment, the maximum height of the telescoping mast is about 33 meters, alternatively about 36.5 meters, alternatively about 46 meters. In an embodiment, the maximum vertical length of the telescoping mast is about 7 meters, and the maximum horizontal length of the telescoping mast is about 7 meters. A preferred work-over rig may be obtained from National Oilwell Varco (NOV) located in Houston, Tex. In an embodiment, the work-over rig 121 may have a v-door hinged to one of its sides to allow personnel and equipment to pass to and from it. The v-door preferably folds up when the work-over rig 121 is stowed during transport and lift-up.

The modular tanks 171 are preferably designed to be stackable. In this manner, they may be stowed on top of one another, which will save deck space during transport and lift-up. In a preferred embodiment, there two modular tanks 171; however, in other embodiments there may be from zero to any number of modular tanks 171 that fit onto the vessel, preferably from 2 to 6 modular tanks. The modular tanks 171 are of a width and shape sufficient to span the gap between the extension beams 115 when the extension beams 115 are engaged in the tracks 156 of the Elevating Support Vessel 100. Alternatively, each modular tank 171 is a shell containing any number of small tanks within. In this embodiment, the modular tanks 171 may be rest on the lower foot of the inside of each extension beam 115, as shown in FIG. 6.

Each modular tank 171 may be of a length independent from each other. Preferable lengths range from about 1.5 meters to about 5 meters, alternatively from about 2 meters to about 4 meters, alternatively about 3 meters. The modular tanks 171 are preferably designed to engage the extension beams 115 by any of a variety of suitable means, including, pins, hooks, straps, resting within, and the like, and the extension beams 115 are preferably designed to receive the modular tanks 171. The modular tanks 171 are preferably hollow structures that may be used to store fluids, alarm systems, fluid manifold systems, and provide passageways for electrical, hydraulic and fluid systems. In an embodiment, the modular tanks 171 span the horizontal gap between the deck 106 and the modular traverse beam 118. Thus, the modular tanks 171 may serve as a bridge between the Elevating Support Vessel 100 and work-over rig 121 for piping, equipment, electrical wiring, personal and the like. Alternatively, the modular tanks 171 may be spaced apart from each other along the horizontal axis at any distance, preferably from between about 1 meter to about 3 meters.

The pipe bridge 174 may be employed in some embodiments. In those embodiments, preferably at least two modular tanks 171 are used. The pipe bridge 174 may be designed to be laid across each modular tank 171 to bridge their distance along the horizontal axis, and carry piping and other equipment from the deck 106 to the work-over rig 121. The pipe bridge 174 is from about 8 meters to about 20 meters in length, preferably about 15 meters; about 1 meter to about 3 meters in width and height, independently. The pipe bridge 174 may additionally serve to provide passageways for electrical, hydraulic and fluid systems underneath its working deck. The pipe bridge 174 may be further designed to receive the v-door of the work-over rig 121. In this manner, the pipe bridge 174 is moveable about the modular tanks 171 along the vertical axis, and tracks the movement of the work-over rig's 121 v-door, if any. However, the pipe bridge 174 is generally stationary along the horizontal axis. Additionally, a ramp may be secured to an end of the pipe bridge 174 to allow personnel and equipment to move from the pipe bridge 174 to the deck 106.

In an embodiment, the extension assembly 177 is assembled using the below-described methods of selecting of jack-up location and holding station, and the above-described crane. In this embodiment, a suitable location within about 22 meters from a platform 180 is selected by the below-described method (ensuring that the jack-up legs avoid can holes and debris). The Elevating Support Vessel 100 is held in station by the below-described method and jacked-up to an elevation within about 3 to about 6 meters, i.e., higher, lower, or even, of the upper deck of the platform 180. Once the Elevating Support Vessel 100 is in position, a personnel basket may be attached to the end of the crane 112, and persons may be transported from the Elevating Support Vessel 100 to the platform 180. This method is generally safer, and more efficient, than transporting persons using swing ropes and/or boat dock interventions. These persons may begin work on the platform 180 while the extension assembly 177 is being assembled.

Continuing with the method, and in an embodiment, the crane 112 is used to lift a first extension beam 115 from the transom of the Elevating Support Vessel 100 over a first track 156 of the Elevating Support Vessel 100. The crane 112 is then used to lower the first extension beam 115, and engage the same with the first track 156. The first extension beam 115, may then be pinned to a first plate moment plate 175. Once the first extension beam 115 is secured, the procedure is repeated and a second extension beam 115 is secured to a second track 156 of the Elevating Support Vessel 100. The second extension beam 115 may then be pinned to a second moment plate 175. In an embodiment utilizing modular tanks, the crane 112 is used to lift a first modular tank 171 and position it between the two secured extension beams 115. The crane 112 is then used to lower the first modular tank 171, and engage the same with the extension beams 115. After the first modular tank 171 is secured, the process may be repeated and any number of modular tanks 171 may be secured to the extension beams 115. In an embodiment utilizing a pipe bridge 174, the crane 112 is used to lift the pipe bridge 174 and position it onto the modular tanks 171.

The crane 112 may be used to lift and position the modular traverse beam 118 over the extension beams 115. The crane 112 is then used to lower the modular traverse beam 118, and engage the same with the extension beams 115. Once the modular traverse beam 118 is secured, the crane 112 is used to lift and position the workover rig 121 over the modular traverse beam 118. The crane 112 is then used to lower the workover rig 121, and engage the same with the modular traverse beam 118. After the workover rig 121 is secured to the modular traverse beam 118, the hydraulic jacking systems may be installed such that the workover rig 112 is movable over the deck of the platform 180. At any point after the modular traverse beam 118 is secured, the crane 112 may be used to lift and position the blowout preventer over the rails of the modular traverse beam 118. The crane 112 is then used to lower the blowout preventer, and engage the same with the rails of the modular traverse beam 118.

Safety systems such as v-door(s), stairways, handrails, anti-fall devices, wash stations, and the like should be installed/employed during the method as it becomes safe to do so. The extension assembly 177 may be disassembled using the crane 112 by the reverse process.

Methods of Holding Station

The Elevating Support Vessel 100 preferably has the ability to hold station. In an embodiment, the Elevating Support Vessel 100 holds station using the azimuthing thrusters. In this embodiment, a set point is determined. A GPS device, preferably in combination with a gyroscope and other attitude measuring devices, provide digital signals to a computer informing the computer how far off from the set point the Elevating Support Vessel 100 has traveled. The computer sends a signal to the azimuthing thrusters, which engages the azimuthing thrusters to correct for the error. Thus, in an embodiment, the azimuthing thrusters of the Elevating Support Vessel 100 are in signal communication with a computer. In an alternative embodiment, any number of the azimuthing thrusters may be in signal communication with a computer, and any number of the azimuthing thrusters may be in signal communication with each other and/or the computer. In these embodiments, the Elevating Support Vessel 100 may remain within about a three meter radius from the set point. The ability to hold station is especially important while the legs are being lowered to the sea/ocean floor until the Elevating Support Vessel 100 is supported by its jack-up legs. Preferably, the Elevating Support Vessel 100 can hold station, using only the azimuthing thrusters, in a current of between 0 to about 3 knots. In the embodiment wherein the Elevating Support Vessel 100 holds station during deployment of the jack-up legs, there may be forces acting on the jack-up legs, such as undercurrents. In such situations, the net forces acting on the Elevating Support Vessel 100 is called the effective current, and the Elevating Support Vessel 100 can preferably hold station in an effective current of between 0 to about 3 knots. In these embodiments, the surface current may or may not be above about 3 knots.

In another embodiment, the Elevating Support Vessel 100 may hold station using the azimuthing thrusters in combination with a mooring system. This embodiment is especially preferable if the current, or effective current, is greater than about 3 knots. The mooring system is preferably either a two or four-point mooring system, and a four-point mooring system is preferred in effective currents over about 3 knots.

In a two-point mooring system, a first anchor is connected to one end of the Elevating Support Vessel's 100 transom, and a second anchor is connected to the opposite end of the Elevating Support Vessel's 100 transom. In an alternative two-point mooring system, a first anchor is connected to one end of the Elevating Support Vessel's 100 bow, and a second anchor is connected to the opposite end of the Elevating Support Vessel's 100 bow. In a four-point mooring system, a first anchor is connected to one end of the Elevating Support Vessel's 100 bow, a second anchor is connected to the opposite end of the Elevating Support Vessel's 100 bow, a third anchor is connected to one end of the Elevating Support Vessel's 100 transom, and a fourth anchor is connected to the opposite end of the Elevating Support Vessel's 100 transom. Preferably, the azimuthing thrusters are used to correct for any deviation should the Elevating Support Vessel 100 deviate from its set point. The azimuthing thrusters are put to greater use in a two-point mooring system than in a four-point mooring system. The use of one, three, and greater than four anchors is also contemplated.

In an embodiment, the anchors each weight from about 4.5 megagrams to about 9 megagrams, and preferably about 6.8 megagrams. The anchors are preferably connected to the Elevating Support Vessel 100 by an about 3.8 centimeter thick wire rope, which is from about 760 meter to about 915 meters in length. Alternatively the anchors are connected to the Elevating Support Vessel 100 by a chain, or a combination of a wire rope and chain, which is from about 760 meter to about 915 meters in length.

In an embodiment, the crane 112 is used to retract the anchor. In this embodiment, once the first anchor is released from the sea/ocean floor the azimuthing thrusters will be used to correct for the deviation that the Elevating Support Vessel 100 undergoes from the set point. The azimuthing thrusters continue to correct for any deviation from the set point as the additional anchor(s) are retracted. Alternatively, after the first anchor is released from the sea/ocean floor, the azimuthing thrusters serve to hold tension against the other anchors such that the vessel holds station.

Method of Selecting a Jack-Up Location

A method of selecting a location to jack-up an Elevating Support Vessel 100 is now described. In an embodiment of the method, an Elevating Support Vessel 100 is moved within proximity to an offshore structure, preferably, an oil and gas facility. The Elevating Support Vessel is preferably moved within about 30 meters from the edge of the platform, alternatively within about 20 meters, alternatively within about 10 meters. The Elevating Support Vessel 100 is moved around the platform to obtain a map of the sea floor. Alternatively, or in addition to the map obtained by the Elevating Support Vessel 100, a remote operated vehicle ("ROV") is deployed from the Elevating Support Vessel 100, and images the sea floor. The map of the sea floor is then used to determine a suitable location to lower the jack-up legs. Preferably, the location selected does not contain pits caused by previous jack-up vessels, commonly referred to as "can holes", debris, pipe ties, or other obstructions. Once in location, the legs of the Elevating Support Vessel 100 are jacked-up, and the Elevating Support Vessel 100 is raised out of the water.

The ROV may be an unmanned submersible. Preferably, the ROV can dive below the surface of the water and obtain detailed images of the sea floor using a side acoustic scanner and/or bottom contour sonar, and the like equipment. The ROV may have a range of from about 30 meters to about 300 meters, or more, which may permit the Elevating Support Vessel 100 to remain at a distance further away from the platform such as at least about 30 meters, alternatively at least about 50 meters, alternatively at least about 100 meters. In an embodiment, the ROV has an umbilical cord that carries power to it, as well as electrical signals and data to and from the Elevating Support Vessel 100. Alternatively, the ROV can be remotely controlled.

The sea floor may be mapped using any depth finding device and method, and is preferably mapped using side acoustic scanning and/or multi-beam echo scanning. Side acoustic scanning is similar to sonar, in that sound waves are transmitted out to a target area, i.e., the sea floor. The time for the sound waves to travel out to the target area and back to receiver of the side acoustic scanning device is used to determine the range to the target. The distance that the Elevating Support Vessel 100 is from the platform when mapping the sea floor will depend on the optimum range of the mapping device, i.e., side acoustic scanner. The Elevating Support Vessel 100 is preferably far enough from the platform's edge to ensure safe movement, yet close enough to the platform's edge to obtain a map of the sea floor. A preferred depth finding device and method is the use of a SeaBeam 1185 in conjunction with HYPACK™ software. Such a system is available from L-3 Communications Corporation located in New York, N.Y. HYPACK™ is a registered trademark of Coastal Oceanographics, Inc., located in Middlefield, Conn.

The reach of the Elevating Support Vessel's 100 onboard skiddable crane permits the Elevating Support Vessel 100 to select a position further away from the platform than previously possible. In an embodiment, the Elevating Support Vessel 100 is located and jacked-up between about 7 and about 14 meters from the edge of the platform, alternatively from about 15 meters to about 20 meters, and alternative at most about 23 meters from the edge of the platform.

Single Well Conductor Pipe Hand-Off

In an embodiment, the Elevating Support Vessel 100 may be used to relieve a jack-up drilling rig from its duty of securing a single well conductor pipe. In this embodiment, the jack-up drilling rig has been used to drill case and cement the single well conductor pipe; however, the pipe has not yet been perforated. The Elevating Support Vessel 100 is outfitted with an arm suitable to hold the single well conductor pipe.

The Elevating Support Vessel 100 is moved to a location such that its arm is within reaching distance from the single well conductor pipe. Preferably the reaching distance is less than about 6 meters. The jack-up legs of the Elevating Support Vessel 100 are lowered until they are pinned, i.e., just touching the sea/ocean floor. During this operation, the methods of holding station, as described above, may be implemented. Once the jack-up legs of the Elevating Support Vessel 100 are pinned, the arm of the Elevating Support Vessel 100 extends to hold the single well conductor pipe. The jack-up drilling rig releases the single well conductor pipe and is tugged away from location. With the single well conductor pipe in hand, the Elevating Support Vessel 100 is jacked-up to a height sufficient to avoid the crests of the waves. The Elevating Support Vessel 100 may use its crane to assemble the workover rig to its transom, as described above, such that work may be done on the single well conductor pipe.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawings.

The invention claimed is:

1. A method comprising:

moving an elevating support vessel within proximity of an offshore structure;

mapping at least a portion of a sea floor near the offshore structure;

using the mapped portion of the sea floor and attitude measuring devices to determine a jack-up location, wherein the attitude measuring devices are in communication with a computer;

moving the elevating support vessel to the determined jack-up location;

using the attitude measuring devices to determine subsequent positions of the elevating support vessel;

using the computer to measure the subsequent positions of the elevating support vessel relative to the jack-up location;

using the computer to determine an amount of force and a vector direction that the must be exerted on the elevating support vessel to move the elevating support vessel back to the jack-up location;

transmitting an electrical signal to the at least three azimuthing thrusters to move the elevating support vessel in the determined force and vector direction;

using a crane disposed on a crane support apparatus to lower a first cable from the elevating support vessel to the sea floor, wherein a first end of the first cable is affixed to first end of the elevating support vessel's transom and the second end of the first cable is affixed to an anchor, and the crane support apparatus comprises:

at least two vertical members with each vertical member having a first and second end, the first end of the first vertical member is affixed to a first track, the first end of the second vertical member is affixed to a second track, the first and second tracks are affixed to a deck of the elevating support vessel, the second end of the first vertical member is affixed to a first side of a platform, the second end of the second vertical member is affixed to a second side of the platform; and a column having a proximate and distal end, the proximate end is affixed to the platform, and the crane is rotatably affixed to the distal end of the column, the platform has a lower side disposed at least about 2 meters above the deck, the crane support apparatus is movable along the track;

using the crane to lower a second cable from the elevating support vessel to the sea floor, wherein a first end of the second cable is affixed to second end of the elevating support vessel's transom and the second end of the second cable is affixed to an anchor, wherein the Elevating Support Vessel remains within at least a 3 meter radius from the jack-up location; and jacking-up the elevating support vessel.

2. The method of claim 1, wherein the first end of the elevating support vessel's transom is a first distal end of the elevating support vessel's transom along the vertical axis, and the second end of the elevating support vessel's transom is a second distal end of the elevating support vessel's transom along the vertical axis, wherein the first distal end and second distal end are spaced at least 5 meters apart along the vertical axis.

3. A method comprising:

moving an elevating support vessel within proximity of an offshore structure;

mapping at least a portion of a sea floor near the offshore structure;

using the mapped portion of the sea floor and attitude measuring devices to determine a jack-up location, wherein the attitude measuring devices are in communication with a computer;

moving the elevating support vessel to the determined jack-up location;

using the attitude measuring devices to determine subsequent positions of the elevating support vessel;

using the computer to measure the subsequent positions of the elevating support vessel relative to the jack-up location;

using the computer to determine an amount of force and a vector direction that the must be exerted on the elevating support vessel to move the elevating support vessel back to the jack-up location;

transmitting an electrical signal to the at least three azimuthing thrusters to move the elevating support vessel in the determined force and vector direction;

using a crane disposed on a crane support apparatus to lower a first cable from the elevating support vessel to the ocean sea floor, wherein a first end of the first cable is affixed to first end of the elevating support vessel's bow and the second end of the first cable is affixed to an anchor, and the crane support apparatus comprises:

at least two vertical members with each vertical member having a first and second end, the first end of the first vertical member is affixed to a first track, the first end of the second vertical member is affixed to a second track, the first and second tracks are affixed to a deck of the elevating support vessel, the second end of the first vertical member is affixed to a first side of a platform, the second end of the second vertical member is affixed to a second side of the platform; and a column having a proximate and distal end, the proximate end is affixed to the platform, and the crane is rotatably affixed to the distal end of the column, the platform has a lower side disposed at least about 2 meters above the deck, the crane support apparatus is movable along the track;

using the crane to lower a second cable from the elevating support vessel to the ocean sea floor, wherein a first end of the second cable is affixed to second end of the elevating support vessel's bow and the second end of the second cable is affixed to an anchor, wherein the Elevating Support Vessel remains within at least a 3 meter radius from the jack-up location; and jacking-up the elevating support vessel.

4. The method of claim 3, wherein the first end of the elevating support vessel's bow is a first distal end of the elevating support vessel's bow along the vertical axis, and the second end of the elevating support vessel's bow is a second distal end of the elevating support vessel's bow along the vertical axis, wherein the first distal end and second distal end are spaced at least 5 meters apart along the vertical axis.

5. The method of claim 3, further comprising:

using the crane to lower a third cable from the elevating support vessel to the sea floor, wherein a first end of the third cable is affixed to a first end of the elevating support vessel's bow and the second end of the third cable is affixed to a third anchor; and using the crane to lower a fourth cable from the elevating support vessel to the sea floor, wherein a first end of the fourth cable is affixed to a second end of the elevating support vessel's bow and the second end of the fourth cable is affixed to a fourth anchor.

6. The method of claim 3, wherein the first end of the elevating support vessel's bow is a first distal end of the elevating support vessel's bow along the vertical axis, and the second end of the elevating support vessel's bow is a second distal end of the elevating support vessel's bow along the vertical axis, wherein the first distal end and second distal end are spaced at least 5 meters apart along the vertical axis.

* * * * *